(12) United States Patent
Liu (10) Patent No.: US 7,792,985 B2
(45) Date of Patent: Sep. 7, 2010

(54) METHOD FOR IMPLEMENTING INFORMATION FLOW TRANSMISSION IN NEXT GENERATION NETWORK

(75) Inventor: Enhui Liu, Shenzhen (CN)

(73) Assignee: Huawei Technologies Co., Ltd., Shenzhen (CN)

(\*) Notice: Subject to any disclaimer, the term of this patent is extended or adjusted under 35 U.S.C. 154(b) by 276 days.

(21) Appl. No.: 11/844,169

(22) Filed: Aug. 23, 2007

(65) Prior Publication Data

US 2008/0046565 A1    Feb. 21, 2008

Related U.S. Application Data

(63) Continuation of application No. PCT/CN2005/001585, filed on Sep. 28, 2005.

(30) Foreign Application Priority Data

Feb. 24, 2005    (CN) .................... 2005 1 0008857

(51) Int. Cl.
*G06F 15/16* (2006.01)
(52) U.S. Cl. .................. 709/232; 709/226; 709/228; 709/235; 709/250
(58) Field of Classification Search ................ 709/228, 709/232, 235, 226, 250
See application file for complete search history.

(56) References Cited

U.S. PATENT DOCUMENTS 6,910,074 B1 * 6/2005 Amin et al. ................. 709/227
6,975,621 B2   12/2005 Deshpande et al.
7,024,203 B1    4/2006 Naghian
7,716,333 B2 *  5/2010 Bowman-Amuah ......... 709/226

(Continued)

FOREIGN PATENT DOCUMENTS

CN          1390017         1/2003

(Continued)

OTHER PUBLICATIONS

"Architectural Framework for the Delivery of Time-Critical Services Over Cable Television Networks Using Cable Modems," *International Telecommunication Union*, J160 2/2: i-43 (Feb. 13, 2002).

(Continued)

*Primary Examiner*—Michael Won
(74) *Attorney, Agent, or Firm*—Leydig, Voit & Mayer, Ltd.

(57) ABSTRACT

A method for implementing information flow transmission in an NGN, includes: setting in the NGN a signaling channel for transmitting a signaling flow of an NGN service, and reserving resources for the signaling channel; transmitting, by a sending terminal and with a highest priority, the signaling flow of the NGN service contained in a customer traffic over the signaling channel to a receiving terminal. Straightway and reliable transmission of signaling flow is guaranteed by setting the signaling channel for the signaling flow and reserving resources for the signaling channel, and the service reachability is guaranteed in the signaling flow transmission aspect. Embodiments of the present invention further provide a method for transmitting a media flow of the NGN service, a method for controlling performing resource and admission for the media flow of the NGN service and a method for guaranteeing the reliable transmission of an emergent call service in the NGN.

36 Claims, 2 Drawing Sheets

U.S. PATENT DOCUMENTS

| | | | |
|---|---|---|---|
| 2002/0080888 A1* | 6/2002 | Shu et al. | 375/295 |
| 2003/0012176 A1 | 1/2003 | Kondylis et al. | |
| 2004/0196868 A1 | 10/2004 | King | |
| 2004/0224688 A1 | 11/2004 | Fischer | |
| 2005/0018607 A1 | 1/2005 | Frouin | |
| 2005/0025105 A1 | 2/2005 | Rue | |
| 2006/0029048 A1 | 2/2006 | Deshpande et al. | |

FOREIGN PATENT DOCUMENTS

| | | | |
|---|---|---|---|
| CN | 1398089 A | | 2/2003 |
| CN | 1585382 A | | 2/2005 |
| CN | 100499459 C | | 6/2009 |
| EP | 1 475 979 A1 | | 11/2004 |
| GB | 2 404 531 A | | 2/2005 |
| JP | 2002-016618 A | | 1/2002 |
| WO | WO 00/49824 A1 | | 8/2000 |
| WO | WO 01/47287 A2 | | 6/2001 |
| WO | WO 02/078278 A1 | | 10/2002 |

OTHER PUBLICATIONS

"Revision 1 of TR-RACS, FGNGN-OD-00074," International Telecommunication Union, 1-22 (Dec. 3, 2004).

Summons to Attend Oral Proceedings for counterpart European Patent Application No. 05791953.2 dated Apr. 2, 2009.

State Intellectual Property Office of the People's Republic of China, Examination Report in Chinese Patent Application No. 2005100088579 (Aug. 31, 2007).

European Patent Office, Examination Report in European Application No. 05791953.2 (Sep. 4, 2008).

Blake et al., "An Architecture for Differentiated Services," Network Working Group, Request for Comments: 2475, Memo (Dec. 1998).

Yavatkar et al., "A Framework for Policy-Based Admission Control," Network Working Group, Request for Comments: 2753, Memo (Jan. 2000).

International Telecommunication Union, "Revision 1 of TR-RACS," Telecommunication Standardization Sector, Study Period 2005-2008, Focus Group on Next Generation Networks, FGNGN-OD-00074 (Nov. 30-Dec. 3, 2004).

$3^{rd}$ Generation Partnership Project (3GPP), "Technical Specification Group Services and System Aspects; End-to-End Quality of Service (QoS) Concept and Architecture (Release 6)," 3GPP TS 23.207 V6.4.0 (Sep. 2004).

ETSI, "TISPAN NGN Functional Architecture, Release 1, Implementation Utilizing and IMS-Based Core," Draft ETSI ES 2XX XXX V<1.0.3> (Sep. 2004).

* cited by examiner

METHOD FOR IMPLEMENTING INFORMATION FLOW TRANSMISSION IN NEXT GENERATION NETWORK

This application is a continuation of International Patent Application No. PCT/CN2005/001585, filed Sep. 28, 2005, which claims priority to Chinese Patent Application No. 200510008857.9, filed Feb. 24, 2005, both of which are hereby incorporated by reference.

FIELD OF THE INVENTION

The present invention relates generally to the field of Next Generation Network (NGN) technologies, and more particularly, to a method for implementing information flow transmission in an NGN.

BACKGROUND OF THE INVENTION

In any network, a customer always hopes to implement service transmission over the network quickly and with high quality. The case is true as for an NGN. The NGN is an integrated network, which integrates fixed communication with mobile communication by using packet technologies, such as IP technologies, as the bearer network technologies, and carries various telecommunication services such as voice, image and data over IP connections between communication entities. At present, service reachability arises as a requirement for the NGN, which requires that a customer can obtain his or her subscribed NGN services on demand no matter which access technology the NGN applies.

For implementing the service reachability, the signaling flow of the NGN services should be ensured to be straightway at any moment and be transmitted reliably. In an IP access network of the NGN, all IP packets issued by customers are transmitted forward with a best-effort mode or a priority mode, and the signaling flow and the media flow of the NGN services are mixed in transmission. Since the network resources are always limited, when any segment or any node of the network between a customer and a service control function entity is fully-loaded or congested, the signaling flow of the NGN services, which contains a service request signaling packet of the customer, may be discarded and unable to reach the service control function entity. As a result, even if the customer requests services of a relatively higher priority, it is possible that no answer will be received and the service reachability fails to be implemented.

Moreover, in the case of mixing the signaling flow and the media flow of the NGN services in transmission, it is difficult for an IP network transmission node to identify whether the transmitted packet is a signaling flow packet or a media flow packet, and to guarantee that the signaling flow packet of the NGN services is not discarded in the case of the congestion, which makes it obviously impossible to implement the service reachability in this case.

The service requested by a customer may also be an emergent call service with a top priority such as a burglar alarm call, a fire alarm call, a traffic alarm call or a first aid call, which use uniform numbers as well known in public and require a round-the-clock straightway connection; and each telephone customer has the right to dial such emergent numbers for seeking help. Such a service requires not only that the signaling flow of service can always be transmitted straightway and reliably, but also that the media flow of service can be established on demand and be transmitted reliably. If a signaling flow is unable to reach a service control entity reliably, it is impossible to establish an application session and start a media flow, say nothing of supporting an emergent call service and guaranteeing the Quality of Service (QoS) of the media flow transmission.

Besides, for solving such problems as address, security and QoS, there may be deployed security devices such as a Net Address Translation (NAT) device and a firewall device in an NGN bearer network; there may also be deployed admission control implemented by a service control entity for the media flow. Due to the variety of service signaling protocol, it should be simple and reliable to guarantee that an NGN service signaling flow is able to pass through these security devices and eventually reach the service control entity. If the NGN service signaling flow is unable to reach the service control entity, it is impossible to trigger the admission control for the media flow by means of a service request.

Major problems of the NGN have been described, and other problems of the currently-built NGN will be described as follows.

The currently-built NGN mainly focuses on packets of voice services; it carries a voice service over an IP physical private network, and still carries a data service over the original Internet network. In other words, a conventional telephone terminal is still connected to a voice network gateway device over the common telephone line, and a computer device is connected to a broadband access server over the Digital Subscriber Line (xDSL) and the Ethernet. As a result, a voice service and a data service are separated from each other from the customer terminal, and the IP private network as the bearer network of the voice service guarantees sufficient redundancy resources to avoid the congestion, thus the transmission reliability of the signaling flow and the media flow of the voice service is guaranteed. Therefore, this IP private network scheme for NGN voice services not only guarantees the customer reachability of the NGN voice services, but also supports emergent call services.

Though the above IP private network scheme for the NGN voice services guarantees the transmission of voice service, the final objective of the NGN is to carry over one all-IP network all NGN services, i.e. all IP value-added service consisting of voice services, video services and data services. Along with the enrichment of NGN service types, the percentage of all NGN services occupied by the voice services is very small and gradually decreases, so that operators need to consider the transmission performance of other services. If all NGN services are carried over the IP physical private network, the following drawbacks will occur.

1) The cost of operation and maintenance of IP physical private network is very high, which makes the cost of operation and maintenance of the NGN very high;

2) Each IP private network needs to set a certain amount of resource redundancy, which makes the redundancy waste of the entire NGN resources very severe; and 3) Because different services are transmitted by a respective private network, it is impossible to provide multimedia terminal customers with integrated IP multicast services, and the IP private network is unable to guarantee the transmission quality of service at present.

The current NGN scheme has another trend that the NGN access network and the NGN core network are gradually utilizing IP technology. In an all-IP bearer network, a common interface between a customer and the network utilizes the IP technology, and the end-to-end transmission of voice, video and data services is implemented by means of the IP technology. Essentially, an NGN service refers to as an operative and administrable IP value-added service of the telecom level. To guarantee the real-time performance of the NGN services and the QoS of services with a high priority, it is possible to logically partition the IP network resources with a preset configuration mode; different logic parts carry different services. For example, voice, video and data services are isolated in the access network and the core network, and are respectively provided with reserved resources. These services may be isolated and provided with respective reserved resources by means of the Permanent Virtual Circuit (PVC) technology or the Virtual Local Area Network (VLAN) technology in the access network and by means of the Multi-Protocol Label Switching (MPLS) technology or the Virtual Private Network (VPN) technology in the core network. The admission control is performed at the ingress of network edge, and different service media flows are labeled with different forward priorities and discard priorities for forward transmission. With this configuration, it is possible to guarantee that the routing and resources occupation of different service types do not interfere with each other.

The signaling flow and the media flow are still transmitted in a mixed way in the logical network according to the NGN scheme, and only the signaling and the media flows of the service with the highest priority are guaranteed to be transmitted straightway and reliably in any case of resource occupancy rate. Though the resources are separately reserved for the signaling flow, the logical bearer network is partitioned and the resources are reserved only for the signaling flowing of the NGN voice services, and the signaling flow isolation associated with other NGN services is not considered uniformly. In practice, a telecommunication operator should guarantee that the signaling flows of all NGN services pre-subscribed by a customer are transmitted straightway and reliably no matter which service level or service type the service is of. It has not been recognized that guaranteeing the service reachability, i.e. the straightway and reliable transmission of signaling flow of all telecom-level services in any case of resource occupancy rate, is of the most importance for all telecom-level services in the discussion of the QoS problem of the NGN. It, however, has not been recognized either that the straightway and reliable transmission of signaling flow of all telecom-level services in any case of resource occupancy rate is the chief condition for triggering the NGN resource and admission control function entity to work and supporting an emergent call service in the NGN.

In particular, though the latter NGN scheme guarantees the service QoS within the planning range of traffic by means of the reserved resources, and improves the network resource efficiency beyond the IP private network scheme, it still has the following drawbacks.

1) Because the signaling flows and the media flows of the NGN service are still mixed while being transmitted in the logical network, it is also difficult to guarantee the straightway and reliable transmission of signaling flows of the service with a relative low priority and signaling flows of the free best-effort service in any case of resource occupation rate, and it is difficult to guarantee the service reachability of the service with the relative low priority and the best-effort service, which makes it difficult to guarantee the service request triggers the admission control for the media flow.

2) When the signaling flow is transmitted straightway, the resource reserved for high priority services may be occupied by the free best-effort service instead of the service with a relative low priority, which causes a resource-inversion condition. In other words, when the network has free resources, the service with the relative low priority is unable to get resource while the free best-effort may obtain the resource which may be grabbed by the service with a high priority.

3) It is impossible to improve the capability of anti-delay, anti-jitter and anti-packet-lost of the media flow.

To sum up, the current NGN scheme is unable to guarantee that signaling flows of all NGN services are transmitted straightway and reliably, which makes it difficult to implement the service reachability. The signaling flow of the NGN service is unable to reach the service control entity, so that the media flow can not be transmitted, which makes it difficult to implement an emergent call service and trigger the admission control for the media flow.

SUMMARY OF THE INVENTION

A method for implementing information flow transmission in a Next Generation Network NGN, comprising:

setting, in the NGN, a signaling channel for transmitting a signaling flow of an NGN service, and reserving resources for the signaling channel; and transmitting, by a sending terminal and with a highest priority, the signaling flow of the NGN service contained in a customer traffic over the signaling channel to a receiving terminal.

An IP access network, further comprising:

an access network signaling channel, configured with reserved resources to transmit, with a highest priority, a signaling flow of an NGN service contained in a customer traffic.

An IP core network, further comprising:

a core network signaling channel, configured with reserved resources to transmit, with a highest priority, a signaling flow of an NGN service contained in a customer traffic.

A network node, comprising:

means for setting a signaling channel for transmitting a signaling flow of an NGN service, and reserving resources for the signaling channel; and means for transmitting, with a highest priority, the signaling flow of the NGN service contained in a customer traffic over the signaling channel

DETAILED DESCRIPTION OF THE INVENTION

For guaranteeing the service reachability of an NGN, according to the solution of embodiments of the present invention, sufficient resources are always reserved for signaling flows of NGN services, and signaling packets of an NGN service are transmitted with a highest priority in the network without congestion and packet-lost.

Figure 1:
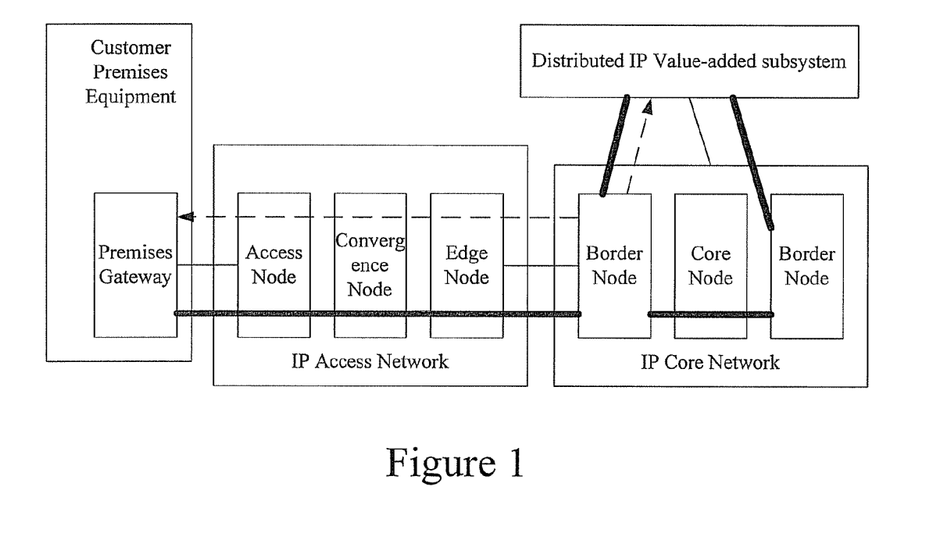
FIG. 1 is a schematic diagram illustrating the structure of the NGN with an all-IP bearer.

The solution in accordance with embodiments of the present invention mainly aims at an NGN with an all-IP bearer, the structure of which is as shown in FIG. 1.

While an information flow is transmitted in the NGN, in the uplink direction, a Customer Premises Equipment (CPE) sends the information flow to an IP access network via a premise gateway and an access node of the IP access network; the IP access network sends the information flow to a border node of the IP core network via an aggregation node and an edge node of the IP access network; the border node of the IP core network sends the information flow to the distributed IP value-added service subsystem or other border nodes as required.

In the downlink direction, the IP core network sends to the IP access network the information flow of the IP value-added service subsystem or other border nodes; the IP access network sends the information flow to its access node via its aggregation node and edge node, and sends the information flow to the premise gateway of the CPE via the access node.

Based on the NGN and the current information flow transmission mode as shown in FIG. 1, the solution according to embodiments of the present invention allocates a signaling flow of the information flow with a channel for transmitting the signaling flows in the whole transmission path, reserves sufficient resources for the channel, and transmits the signaling flow over the channel.

Since the information flow is transmitted both in the uplink direction and in the downlink direction, the signaling flow transmission in the two directions is respectively described as follows.

Figure 2:
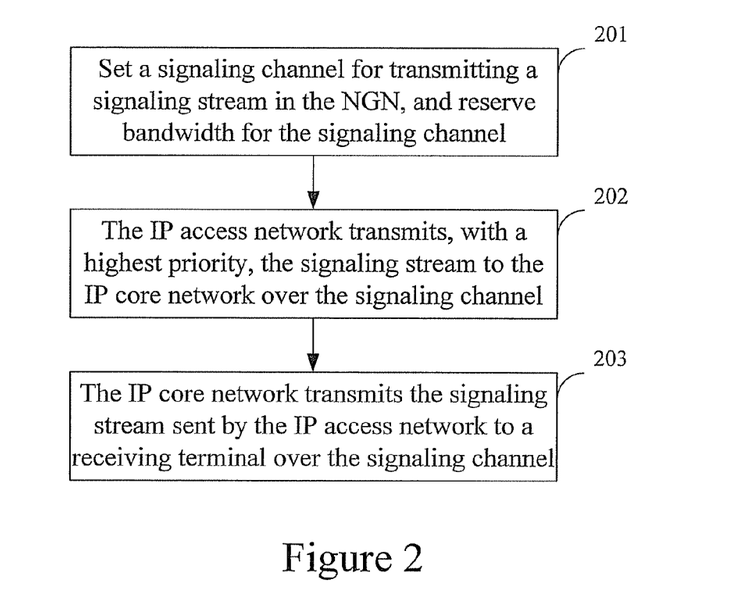
FIG. 2 is a flowchart illustrating signaling flow transmission in an uplink direction in accordance with an embodiment of the present invention.

In particular, the uplink transmission of the signaling flow in accordance with the present invention may be implemented through the process as shown in FIG. 2, which includes:

Block 201: A signaling channel is set for transmitting signaling flows in an NGN, and resources are reserved for the signaling channel.

In particular, an access network signaling channel is set in the IP access network, and a core network signaling channel is set in the IP core network. For the IP access network, the signaling channel may be implemented using the VC technology or the VLAN technology. For the IP core network, the signaling channel may be implemented using the private VPN technology.

The object for reserving resources for the signaling channel is that, in the subsequent transmission procedure, if there is no signaling flow to be transmitted currently, other information flows may occupy the resource; if there is a signaling flow to be transmitted currently, transmission of the signaling flow may be guaranteed by means of the reserved resources.

Block 202: The IP access network transmits, with the highest priority, a signaling flow of the customer traffic sent by a sending terminal to the IP core network over the signaling channel.

In the uplink direction, the premise gateway may be generally regarded as the sending terminal. In particular, the process of the IP access network transmitting the signaling flow includes the following steps.

First, an access node connecting to the premise gateway transmits the signaling flow. The access node firstly needs to obtain the signaling flow before transmitting the signaling flow. There are two cases: if the signaling channel set in the IP access network does not includes any signaling channel between the premise gateway and the access node, i.e. there is no signaling channel set between the premise gateway and the access node, the access node of the IP access network should has the IP capability to split a signaling flow from the customer traffic; if there is a signaling channel set between the premise gateway and the access node, the premise gateway splits a signaling flow from the customer traffic, and sends, with the highest priority, the signaling flow to the access node over the access network signaling channel, and the access node obtains the signaling flow according to an identity of the access network signaling channel.

No matter which of the access node and the premise gateway splits the signaling flow from the customer traffic, identity information for identifying the packet to be a signaling packet should be carried in the packet. The identity information is referred to as signaling identity information. The signaling identity information may be a fixed port number and a protocol number; and if there is a corresponding NGN service agent device, the signaling identity information may also be the destination address of the NGN service agent device.

Secondly, after obtaining the signaling flow, the access node sends, with the highest priority, the signaling flow to the aggregation node over the access network signaling channel.

Thirdly, the aggregation node obtains the signaling flow according to the identity of the access network signaling channel, and sends, with the highest priority, the signaling flow to the edge node over the access network signaling channel.

Finally, the edge node sends the signaling flow to the border node of the IP core network. Since the signaling channel between the edge node of the IP access network and the border node of the IP core network may an access network signaling channel or a core network signaling channel, and the edge node and the border node may be the same device, there are different sending procedures in different cases. In the first case, the border node of the IP core network supports VC or VLAN, thus the edge node of the IP access network forwards with the highest priority the signaling flow in the access network signaling channel to the border node of the IP core network over the access network signaling channel according to the identity of the access network signaling channel. In the second case, the edge node of the IP access network supports VPN, thus the edge node of the IP access network sends with the highest priority the signaling flow in the access network signaling channel to the border node of the IP core network over the core network signaling channel according to the identity of the access network signaling channel. In the third case, the border node of the IP core network may directly obtain the signaling flow according to the identity of the access network signaling channel.

Block 203: The IP core network transmits to the corresponding receiving terminal the signaling flow, which is sent from the IP access network over the signaling channel, over the signaling channel.

The receiving terminal is an IP value-added service subsystem. The IP core network may directly send, by means of the border node and with the highest priority, the signaling flow in the signaling channel to the IP value-added service subsystem over the core network signaling channel according to the identifier of signaling channel.

The uplink signaling flow may be forwarded without packet-lost through the above procedure.

Figure 3:
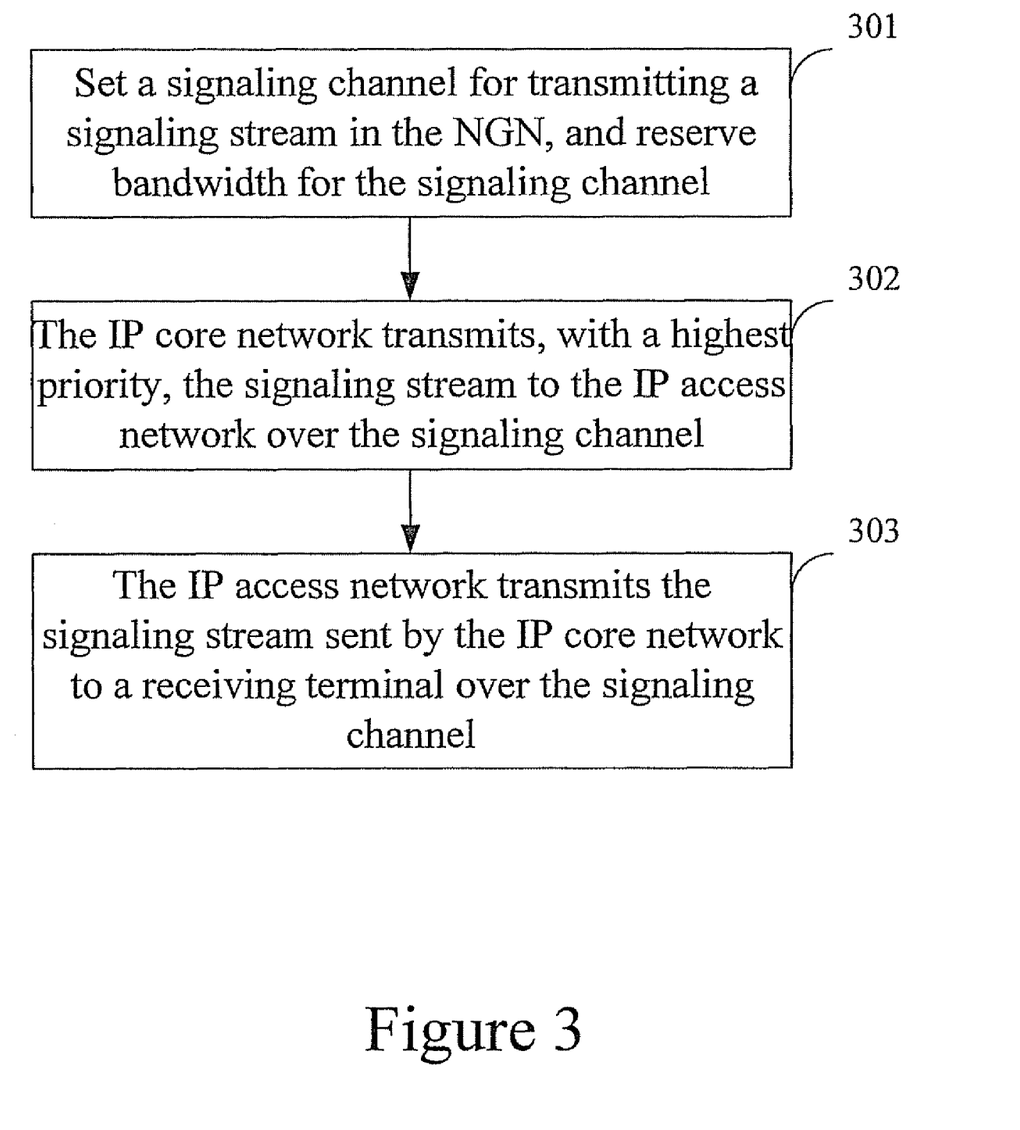
FIG. 3 is a flowchart illustrating signaling flow transmission in a downlink direction in accordance with an embodiment of the present invention.

Referring to FIG. 3, the downlink transmission procedure of a signaling flow is described as follows.

Block 301: A signaling channel is set for transmitting signaling flows in an NGN, and resources are reserved for the signaling channel.

For the downlink transmission procedure, the process of setting the signaling channel is the same as that for the uplink transmission procedure, thus it will not be further described herein.

Block 302: The IP core network transmits, with the highest priority, a signaling flow of the customer traffic sent by a sending terminal to the IP access network over the signaling channel.

The sending terminal is an IP value-added service subsystem. The IP core network firstly splits, by means of a border node directly connecting to the subsystem, a signaling flow from the customer traffic, and forwards, with the highest priority and by means of the border node connecting to the subsystem, the split signaling flow over the core network signaling channel to a border node connecting to the IP access network; the border node connecting to the IP access network sends the signaling flow to the IP access network. If other nodes are needed in the process of forwarding the signaling flow to the border node, these nodes may also obtain the signaling flow according to the identity of the signaling channel, and forward, with the highest priority, the signaling flow over the signaling channel.

There are different relationships between the border node and the edge node when the border node of the IP core network forwards the signaling flow to the edge node of the IP access network. For example, the signaling channel between the border node and the edge node may be a core network signaling channel or an access network signaling channel, or the border node and the edge node may be the same one. In the first case, the border node will send the signaling flow to the edge node of the IP access network over the core network signaling channel; in the second case, the border node will send the signaling flow to the edge node of the IP access network over the access network signaling channel; in the third case, the edge node may directly obtain the signaling flow from the core network signaling channel.

Block 303: The IP access network transmits the signaling flow sent by the IP core network over the signaling channel to the corresponding receiving terminal over the access network signaling channel.

In particular, the edge node of the IP access network forwards with the highest priority the signaling flow to an aggregation node over the access network signaling channel; the aggregation node similarly forwards the signaling flow to an access node.

The receiving terminal may generally be a premise gateway. If there is a signaling channel set between the access node and the premise gateway, the access node forwards the signaling flow to the premise gateway using the above forwarding method; if there is no signaling channel set between the access node and the premise gateway, the access node may just forward, with the highest priority, the signaling flow to the premise gateway.

The downlink signaling flow may be forwarded through the above procedure.

In addition, during the transmission of a flowing flow in the uplink direction or in the downlink direction, if a Net Address Translation (NAT) device and/or a firewall device is deployed in the NGN, the signaling flow in which the destination address is an NGN service agent device may be allowed to pass through the NAT and/or the firewall.

Since there may be malicious attacks to the signaling channel, a signaling monitoring and filtering function may be configured in the customer premise gateway, the edge router of access network and the NGN service agent device. If the access node has the IP capability, the signaling monitoring and filtering function may be configured in the access node. The device configured with the monitoring and filtering function may monitor an IP packet according the packet header information of the IP packet; if it is determined that the IP packet is or may be an invalid packet, the packet will be discarded.

After the signaling channel for the signaling flow is set according to the above scheme, the media flow of an NGN service may be transmitted in accordance with the following scheme, so that the resource-inversion condition is avoided in the process of transmitting a media flow.

According to the scheme, a corresponding channel is set, i.e. a media channel for the media flow is set in the NGN resource other than the reserved signaling channels for the signaling flow. In particular, the media channel includes an access network media channel in the IP access network and a core network media channel in the IP core network. The access network media channel may be set using the VC technology and the VLAN technology; the core network media channel may be set using the VPN technology.

The media channel is different from the signaling channel in that, there is no resource reserved for the media channel, which is to avoid the resource-inversion condition. In addition, there may be various types of media channels, each corresponding to a respective priority; the IP access network and the IP core network may transmit different media flows according to the corresponding priorities.

After the media channel is set, the IP access network and the IP core network may transmit a media flow both in the uplink and downlink directions over the media channel. The transmission is basically the same as that of the signaling flow except that, if there are multiple media channels, the forward nodes of the IP access network and the IP core network may set different priorities for the identities of the media channels, and forward the media flows in the media channels according to the priorities. The corresponding relationship between the identities and the priorities should be preset.

In addition, as for the media flow, the resource and admission control device may determine whether to admit the media flow and determine the QoS level label of the media flow, which includes the information about a forwarding priority and a discarding priority, according to the customer request, the NGN service agent request, the QoS parameter prescribed by the customer and the availability of the network resources; the resource and admission control device may further issue the IP packet header identity information, the information about whether to admit the media flow and the QoS level identity to forwarding nodes located at the edge of network domain through commands, wherein the forwarding may be the customer premise gateway, the edge node of the IP access network and the border node of the IP core network. If the access node of IP access network has the IP capability, the resource and admission control device may also issue the above information to the access node through commands.

After the command creating manner of the resource and admission control device is set, before forwarding a media flow, the forwarding node located at the edge of the network domain should firstly determine whether to admit the media flow according to the IP packet header information of the media flow and the command issued by the resource and admission control device; if the media is to be admitted, the media flow is set with the QoS level label carried in the command and transmitted over the media channel; otherwise, the media flow is directly filtered out, i.e. the media flow is discarded.

While checking the availability of the network resources, the resource and admission control device should guarantee the absolute QoS of the traffic labeled with the highest priority and avoid the congestion in any node of the network according to the detection data and the traffic engineering data. If the network resources are checked to be unavailable and the media flow of the NGN service can not obtain the network resources supporting the high QoS level, the requirement on the QoS level may be decreased so that the media flow of the NGN service may obtain the network resource supporting a lower QoS level. For example, after determining the media flow not to be admitted, the resource and admission control device returns the un-admission reason to the device initiating the resource request; after receiving the un-admission reason, the device initiating the resource request requests resources supporting a lower QoS level for the media flow. Alternatively, the device initiating the resource request may reject the customer service request corresponding to the media flow after receiving the un-admission reason.

If an NAT device and/or a firewall device is deployed in the network and the NGN service agent device only has a signaling agent function, the NGN service agent device, while processing the signaling flow, issues a command to control the NAT device and/or the firewall device in order to implement the traversing and address translation of the media flow. If the NGN service agent device has both a signaling agent function and a media agent function, the NAT and firewall device may be configured to allow the signaling packet and the media packet, in which the destination address is the NGN service agent device, to pass through the NAT and firewall device.

In addition, for solving the problem of delay, jitter and packet-lost in the media flow transmission, a code converting function may be configured in a respective node on the media flow transmission path. At the ingress of the network, the respective node converts the original media flow into a code with better QoS and transmits the encoded media flow in the network; at the egress of the network, the respective node reconvert the encoded media flow into the original media flow with code negotiated between the communication sending terminal and the communication receiving terminal, so that the communication receiving terminal is able to recognize the received media flow. In particular, the NGN service agent device may send the identity, the original encoding algorithm and the converted encoding algorithm of the media flow to the ingress node and the egress node in the media flow transmission path; the ingress node determines the media flow according to the identity, and converts the media flow by means of the converted encoding algorithm; the egress node determines the media flow according to the identity, and reconverts the media flow by means of the original encoding algorithm.

With the above procedures, the media flow may be transmitted on the basis of the reliable transmission of signaling flows, and the resource-inversion condition is avoided.

In addition, if an emergent call service is transmitted, while transmitting the media flow of emergent call service, the resource and admission control device handles the resource request from the emergent call service system in the first place, and set the media flow corresponding to the emergent call service as with the highest priority and the highest QoS level. In the case that there is no resources available for the highest priority and the highest QoS level, the resource and admission control device may release the resource of non-emergent services or reduce the QoS level of the non-emergent services, and carry the media flow of the emergent call service over the released resource. As a result, the real-time establishment and reliable transmission of the media flow of the emergent call service is implemented.

The solution of the present invention guarantees straightway and reliable transmission of the signaling flow by setting a signaling channel for the signaling flow and reserving resources for the signaling channel, and guarantees the service reachability with respect to the signaling flow transmission.

The solution of the present invention further guarantees the reliable transmission of the signaling flow by allowing signaling flows to pass through the NAT device and/or the firewall device.

The solution of the present invention further guarantees the security transmission of signaling channel by setting a signaling monitoring and filtering function in a forward node of the network domain.

Embodiments of the present invention further provide a solution for transmitting the media flowing, including: setting a media channel for a media flow and setting different priorities for different media channels. The solution avoids the resource-inversion condition of prior art when implementing the media flow transmission, thereby guarantees the transmission of the service prescribed by a customer.

For the media flow transmission, the solution of the present invention further guarantees the reliable transmission of the media flow by allowing the media flow to pass through the NAT device and/or the firewall device.

The solution of the present invention further provides a code converting function for the media flow transmission, which converts the original code into a code with better QoS at the ingress of network, and recovers the code with better QoS to the original code at the egress of network, thereby improves the capability of anti-delay, anti-jitter and anti-packet-lost of media flow.

The solution of the present invention filters the suspicious media flow by setting a media flow filtering function at a forward node located at the edge of network domain, which prevents the NGN service subsystem from being attacked.

Embodiments of the present invention further provide a solution of determining, by the resource and admission control device, the media flow of an emergent call service as the highest priority and the highest QoS level, and controlling the network forward node accordingly. The network forward node releases the resource occupied by the non-emergent service or reduces the QoS level of non-emergent service when there is no free transmission resource with the highest priority and the highest QoS level, and transmits the media flow of emergent call service using the released resource. Thus the reliable transmission of the emergent call service is guaranteed.

It should be emphasized that the above-described embodiments, particularly, any 'preferred' embodiments, are merely possible examples of implementations, and are merely set forth for a clear understanding of the principles of the invention. Many variations and modifications may be made to the above-described preferred embodiment without departing substantially from the spirit and principles of the invention. All such modifications and variations are intended to be included herein within the scope of this disclosure and the above-described preferred embodiment and protected by the following claims.

What is claimed is:

1. A method for implementing information flow transmission in a Next Generation Network NGN, comprising:

setting, in the NGN, a signaling channel for transmitting a signaling flow of an NGN service, and reserving resources for the signaling channel; and transmitting, by a sending terminal and with a highest priority, the signaling flow of the NGN service split from a customer traffic over the signaling channel to a receiving terminal;

wherein the NGN comprises an IP access network, an IP core network and an NGN service subsystem; and the process of setting the signaling channel in the NGN comprises:

setting an access network signaling channel for transmitting the signaling flow in an IP access network; and setting a core network signaling channel for transmitting the signaling flow in an IP core network; and wherein the process of the sending terminal transmitting the signaling flow of the NGN service split from the customer traffic over the signaling channel to the receiving terminal comprises:

transmitting, by the IP access network, the signaling flow of the NGN service split from the customer traffic sent by the sending terminal to the IP core network over the access network signaling channel comprising:

recognizing and splitting, by an access node of the IP access network, the signaling flow of the NGN service from the customer traffic, and transmitting, with the highest priority, the signaling flow to an aggregation node over the access network signaling channel;

forwarding, by the aggregation node and with the highest priority, the signaling flow in the access network signaling channel to an edge node over the access network signaling channel according to an identity of the access network signaling channel; and sending, by the edge node, the signaling flow to a border node of the IP core network: and transmitting, by the IP core network, the signaling flow sent by the IP access network over the signaling channel to the receiving terminal over the core network signaling channel.

2. The method of claim 1, wherein IP packet header information of the signaling flow comprises signaling identity information for identifying the packet to be a signaling packet of the NGN service; and the signaling identity information comprises at least a fixed port number and a protocol number, or a destination address directing to an NGN service agent device; and the process of recognizing and splitting the signaling flow of the NGN service from the customer traffic comprises: recognizing and splitting the signaling packet of the NGN service from the customer traffic according to the signaling identity information of the signaling packet.

3. The method of claim 1, wherein IP packet header information of the signaling flow comprises signaling identity information for identifying the packet to be a signaling packet of the NGN service; and the signaling identity information comprises at least a fixed port number and a protocol number, or a destination address directing to an NGN service agent device; and the method further comprises: presetting a signaling channel for signaling transmission between a premise gateway of an NGN customer and the access node of the IP access network; and recognizing and splitting, by the premise gateway, the signaling packet of the NGN service from the customer traffic according to the signaling identity information of the signaling packet, and transmitting, with the highest priority, the signaling packet to the access node of the IP access network over the signaling channel; the process of recognizing and splitting the signaling flow of the NGN service from the customer traffic comprises: recognizing and splitting the signaling flow transmitted in the channel according to the identity of the signaling channel.

4. The method of claim 1, wherein the receiving terminal comprises an NGN service subsystem; the process of the IP core network transmitting the signaling flow sent by the IP access network over the signaling channel to the receiving terminal over the core network signaling channel: transmitting with the highest priority, by a border node and according to the identity of the signaling channel, the signaling flow in the signaling channel to the NGN service subsystem over the core network signaling channel.

5. The method of claim 1, wherein the process of the sending terminal transmitting the signaling flow of the NGN service split from the customer traffic over the signaling channel to the receiving terminal comprises: transmitting, by the IP core network, the signaling flow split from the customer traffic sent by the sending terminal to the IP access network over the core network signaling channel; transmitting, by the IP access network, the signaling flow sent by the IP core network over the signaling channel over the access network signaling channel; and transmitting, by an access node, the signaling flow to the receiving terminal.

6. The method of claim 5, wherein the sending terminal comprises an NGN service subsystem; and the process of transmitting the signaling flow split from the customer traffic sent by the sending terminal to the IP access network over the core network signaling channel comprises:

recognizing and splitting, by a border node connecting to the NGN service subsystem, the signaling flow of the NGN service from the customer traffic, and forwarding, with the highest priority, the signaling flow to a border node connecting to the IP access network over the core network signaling channel; and sending, by the border node connecting to the IP access network, the signaling flow to the IP access network.

7. The method of claim 5, wherein the process of the IP access network transmitting the signaling flow over the access network signaling channel comprises:

forwarding, by an edge node of the IP access network and with the highest priority, the signaling flow sent by the IP core network to an aggregation node of the IP access network over the access network signaling channel; and forwarding, by the aggregation node and with the highest priority, the signaling flow in the access network signaling channel to an access node of the IP access network over the access network signaling channel according to the identity of the access network signaling channel.

8. The method of claim 1, wherein the NGN further comprises a network security device and/or an address translation device; the destination address or the source address of the signaling flow is an NGN service agent device; and the method further comprises:

configuring the network security device and/or the address translation device to allow the signaling flow in which the destination address or the source address is the NGN service agent device to pass through the network security device and/or the address translation device.

9. The method of claim 1, further comprising:

setting, in the NGN resources other than those reserved for the signaling channel, a media channel for transmitting a media flow of the NGN service, and setting different priorities for different media channels when there are more than one media channels; and transmitting, by the sending terminal, the media flow of the customer traffic to a receiving terminal over the media channel.

10. The method of claim 9, wherein the process of setting the media channel for the media flow comprises:

setting an access network media channel for transmitting the media flow in an IP access network, and setting a core network media channel for transmitting the media flow in an IP core network.

11. The method of claim 10, wherein the process of the sending terminal transmitting the media flow split from the customer traffic over the media channel to the receiving terminal comprises:

forwarding, by the IP access network, the media flow split from the customer traffic sent by the sending terminal to the IP core network over the access network media channel; and forwarding, by the IP core network, the media flow to the receiving terminal over the core network media channel; or forwarding, by the IP core network, the media flow split from the customer traffic sent by the sending terminal to the IP access network over the core network media channel; and forwarding, by the IP access network, the media flow to the receiving terminal over the access network media channel.

12. The method of claim 11, further comprising:

determining, by a resource and admission control device, whether to admit the media flow, determining the QoS level of the admitted media flow, and sending the identity information of the media flow, the determined admission information and the QoS level information to a forward node located at an edge of the network in the NGN for execution; and before the IP access network and the IP core network forward the media flow over the media channel, the method further comprising:

determining, by the forward node located at the edge of the network, whether to allow the corresponding media flow to enter the network according to the identity information and the admission information of the media flow, and forwarding the admitted media flow according to the QoS level information.

13. The method of claim 12, further comprising:

returning, by the resource and admission control device, an un-admission reason to the device initiating the resource request if the media flow is not admitted; and requesting, by the device initiating the resource request, resources supporting a lower QoS level for the media flow or rejecting the customer service request corresponding to the media flow after receiving the un-admission reason.

14. The method of claim 10, wherein the transmitted media flow comprises a media flow of an emergent call service; and the method further comprises:

determining, by a resource and admission control device, the media flow of emergent call service to be with the highest priority and the highest QoS level, and sending the admission information, the highest priority and the highest QoS level information of the media flow to a forward node located at an edge of the network edge for executing; and releasing resources occupied by the media flows of non-emergent services or reducing the QoS level of the media flows of the non-emergent services, and transmitting the media flow of the emergent call service using the released resources when there is no resource supporting the highest priority and the highest QoS level.

15. The method of claim 10, wherein the NGN further comprises a network security device and/or an address translation device; the destination address or the source address of the signaling flow is an NGN service agent device; and when the NGN service agent device only has a signaling agent function, the method further comprises:

issuing, by the NGN service agent device and while handling the signaling flow, a command to control the network security device and/or the address translation device; and performing, by the network security device and/or the address translation device, a corresponding security or address translation processing on the media flow according the command.

16. The method of claim 10, wherein the NGN further comprises a network security device and/or an address translation device; the destination address or the source address of the signaling flow is an NGN service agent device; and when the NGN service agent device has both the signaling agent function and a media agent function, the method further comprises:

configuring the network security device and/or the address translation device to allow the signaling flow in which the destination address or the source address is the NGN service agent device to pass through the network security device and/or the address translation device.

17. The method of claim 10, further comprising:

converting, by an ingress node for transmitting the media flow in the network domain, the encoding manner of the media flow, and forwarding the media flow in accordance with the converted encoding manner; and reconverting, by an egress node, the converted encoding manner of the received media flow into the original encoding manner, and forwarding the media flow in accordance with the original coding manner.

18. An IP access network, comprising:

an access network signaling channel, configured with reserved resources to transmit, with a highest priority, a signaling flow of an NGN service split from a customer traffic, wherein the process of transmitting the signaling flow of the NGN service split from the customer traffic over the access network signaling channel comprises:

transmitting, by the IP access network, the signaling flow of the NGN service split from the customer traffic sent by a sending terminal to an IP core network over the access network signaling channel comprising:

recognizing and splitting, by an access node of the IP access network, the signaling flow of the NGN service from the customer traffic, and transmitting, with the highest priority, the signaling flow to an aggregation node over the access network signaling channel;

forwarding, by the aggregation node and with the highest priority, the signaling flow in the access network signaling channel to an edge node over the access network signaling channel according to an identity of the access network signaling channel; and sending, by the edge node, the signaling flow to a border node of the IP core network; and transmitting, by the IP core network, the signaling flow sent by the IP access network over the signaling channel to the receiving terminal over the core network signaling channel.

19. The IP network of claim 18, wherein the border node is configured to transmit, with the highest priority and according to the identity of the signaling channel, the signaling slow in the signaling channel to an NGN service subsystem over a core network signaling channel.

20. The IP access network of claim 18, further comprising:

a border node connecting to an IP core access network, configured to forward, with the highest priority, the signaling flow sent by the IP core network to an aggregation node of the IP access network over the access network signaling channel; and the aggregation node, configured to forward, with the highest priority, the signaling flow in the access network signaling channel to an access node of the IP access network over the access network signaling channel according to an identity of the access network signaling channel.

21. The IP access network of claim 18, further comprising:

a network security device and/or an address translation device, configured to allow the signaling flow in which the destination address or the source address is an NGN service agent device to pass through the network security device and/or the address translation device.

22. The IP access network of claim 18, further comprising:
an access network media channel set in NGN resources other than those reserved for the signaling channel, configured to transmit a media flow of the NGN service.

23. The IP access network of claim 22, further comprising:
a forward node located at the edge of the IP access network, configured to determine whether to allow the corresponding to enter the IP access network according to identity information and admission information of the media flow, and forward the admitted media flow according to QoS level information of the media flow.

24. The IP access network of claim 22, further comprising:
an ingress node, configured to convert a encoding manner of the media flow, and forward the media flow in accordance with the converted encoding manner; and
an egress node, configured to convert the converted encoding manner of the received media flow into an original encoding manner, and forward the media flow in accordance with the original coding manner.

25. An IP core network, comprising:
a core network signaling channel, configured with reserved resources to transmit, with a highest priority, a signaling flow of an NGN service split from a customer traffic, wherein the process of transmitting the signaling flow of the NGN service split from the customer traffic over the core network signaling channel comprises:
 transmitting, by an IP access network, the signaling flow of the NGN service split from the customer traffic sent by a sending terminal to the IP core network over the access network signaling channel comprising:
  recognizing and splitting, by an access node of the IP access network, the signaling flow of the NGN service from the customer traffic, and transmitting, with the highest priority, the signaling flow to an aggregation node over the access network signaling channel;
  forwarding, by the aggregation node and with the highest priority, the signaling flow in the access network signaling channel to an edge node over the access network signaling channel according to an identity of the access network signaling channel; and
  sending, by the edge node, the signaling flow to a border node of the IP core network; and
 transmitting, by the IP core network, the signaling flow sent by the IP access network over the signaling channel to the receiving terminal over the core network signaling channel.

26. The IP core network of claim 25, further comprising:
a border node connecting to an NGN service subsystem, configured to recognize and split the signaling flow of the NGN service from the customer traffic, and forward, with the highest priority, the signaling flow to a border node connecting to the IP access network over the core network signaling channel; and
the border node connecting to an IP access network, configured to send the signaling flow to the IP access network.

27. The IP core network of claim 25, further comprising:
a network security device and/or an address translation device, configured to allow the signaling flow in which the destination address or the source address is an NGN service agent device to pass through the network security device and/or the address translation device.

28. The IP core network of claim 25, further comprising:
a core network media channel set in NGN resources other than those reserved for the signaling channel, configured to transmit a media flow of the NGN service.

29. The IP core network of claim 28, further comprising:
a forward node located at the edge of the IP core network, configured to determine whether to allow the corresponding to enter the IP core network according to identity information and admission information of the media flow, and forwarding the admitted media flow according to QoS level information of the media flow.

30. The IP core network of claim 28, further comprising:
an ingress node, configured to convert a encoding manner of the media flow, and forward the media flow in accordance with the converted encoding manner; and
an egress node, configured to convert the converted encoding manner of the received media flow into an original encoding manner, and forward the media flow in accordance with the original coding manner.

31. A network node, comprising:
means for setting a signaling channel for transmitting a signaling flow of an NGN service, and reserving resources for the signaling channel; and
means for transmitting, with a highest priority, the signaling flow of the NGN service split from a customer traffic over the signaling channel;
wherein the NGN comprises an IP access network, an IP core network and an NGN service subsystem; and the means for setting the signaling channel in the NGN comprises:
 means for setting an access network signaling channel for transmitting the signaling flow in an IP access network; and
 means for setting a core network signaling channel for transmitting the signaling flow in an IP core network; and
wherein the means for transmitting, with a highest priority, the signaling flow of the NGN service split from a customer traffic over the signaling channel comprises:
 means for transmitting, by the IP access network, the signaling flow of the NGN service split from the customer traffic sent by the sending terminal to the IP core network over the access network signaling channel comprising:
  means for recognizing and splitting, by an access node of the IP access network, the signaling flow of the NGN service from the customer traffic, and transmitting, with the highest priority, the signaling flow to an aggregation node over the access network signaling channel;
  means for forwarding, by the aggregation node and with the highest priority, the signaling flow in the access network signaling channel to an edge node over the access network signaling channel according to an identity of the access network signaling channel; and
  means for sending, by the edge node, the signaling flow to a border node of the IP core network; and
 means for transmitting, by the IP core network, the signaling flow sent by the IP access network over the signaling channel to the receiving terminal over the core network signaling channel.

32. The network node of claim 31, further comprising:
means for recognizing and splitting the signaling flow of the NGN service from the customer traffic.

33. The network node of claim 31, further comprising:

means for setting, in the NGN resources other than those reserved for the signaling channel, a media channel for transmitting a media flow of the NGN service, and setting different priorities for different media channels when there are more than one media channels.

34. The network node of claim 33, further comprising:

means for determining whether to allow the corresponding media flow to enter the IP access network according to identity information and admission information of the media flow; and means for forwarding the admitted media flow according to QoS level information of the media flow.

35. The network node of claim 33, further comprising:

means for converting a encoding manner of the media flow, and forwarding the media flow in accordance with the converted encoding manner.

36. The network node of claim 33, further comprising:

means for converting a converted encoding manner of the media flow into an original encoding manner, and forward the media flow in accordance with the original coding manner.

* * * * *